(12) United States Patent
Bowling

(10) Patent No.: US 12,543,613 B2
(45) Date of Patent: *Feb. 10, 2026

(54) CYLINDRICAL DEVICE WITH KNIVES CONNECTED THERETO

(71) Applicant: Enterprise Equipment Solutions, LLC, Orrville, OH (US)

(72) Inventor: Mark G. Bowling, Wooster, OH (US)

(73) Assignee: ENTERPRISE EQUIPMENT SOLUTIONS, LLC, Orrville, OH (US)

( * ) Notice: Subject to any disclaimer, the term of this patent is extended or adjusted under 35 U.S.C. 154(b) by 13 days.

This patent is subject to a terminal disclaimer.

(21) Appl. No.: 18/628,164

(22) Filed: Apr. 5, 2024

(65) Prior Publication Data

US 2024/0251692 A1 Aug. 1, 2024

Related U.S. Application Data

(63) Continuation of application No. 18/330,941, filed on Jun. 7, 2023, now Pat. No. 11,974,513, which is a continuation of application No. 17/088,997, filed on Nov. 4, 2020, now Pat. No. 11,711,991, which is a continuation of application No. 16/135,101, filed on Sep. 19, 2018, now Pat. No. 10,856,462.

(60) Provisional application No. 62/562,092, filed on Sep. 22, 2017.

(51) Int. Cl.
| | |
|---|---|
| *A01B 33/10* | (2006.01) |
| *A01B 33/02* | (2006.01) |
| *A01B 33/12* | (2006.01) |
| *A01B 33/14* | (2006.01) |

(52) U.S. Cl.
CPC .......... *A01B 33/103* (2013.01); *A01B 33/022* (2013.01); *A01B 33/12* (2013.01); *A01B 33/142* (2013.01)

(58) Field of Classification Search
CPC ..... A01B 33/103; A01B 33/022; A01B 33/12; A01B 33/142
See application file for complete search history.

(56) References Cited

U.S. PATENT DOCUMENTS

| | | |
|---|---|---|
| 4,074,737 A | 2/1978 | Stewart |
| 4,199,030 A | 4/1980 | Chance |
| 4,291,445 A | 9/1981 | Johnson |
| 4,573,831 A | 3/1986 | Lacey |
| 4,648,755 A | 3/1987 | Stashko |
| 4,668,122 A | 5/1987 | Riddle |
| 4,790,693 A | 12/1988 | Koblesky |
| 5,873,534 A | 2/1999 | Shinn |
| 6,176,445 B1 | 1/2001 | Shinn |

(Continued)

*Primary Examiner* — Tara Mayo
(74) *Attorney, Agent, or Firm* — Sand, Sebolt & Wernow Co., LPA

(57) ABSTRACT

A knife for a cylindrical rotor includes at least two sharpened edges adapted to cut materials during land clearing or mulching. The knife further includes a top surface and a bottom surface wherein the knife is shaped as an inverted frusto-square pyramid. The knife may further include a tapered sidewall defining one sharpened edge. The angle may be about 30° to about 60°. The knife may have four sharpened edges. The knife further may include an aperture that may be equidistant from the four sharpened edges. The knife is adapted to be moved when one sharpened edge becomes dull. The knife may further include a conical countersunk aperture. The knife may have a thickness of about ¼" to about ½".

20 Claims, 4 Drawing Sheets

(56) References Cited

U.S. PATENT DOCUMENTS

| | | |
|---|---|---|
| 7,708,038 B1 | 5/2010 | Stewart |
| 7,938,350 B2 | 5/2011 | Doppstadt et al. |
| 2008/0245043 A1 | 10/2008 | Shinn |
| 2008/0271326 A1 | 11/2008 | Hu |
| 2010/0043921 A1 | 2/2010 | Liu |
| 2012/0217333 A1 | 8/2012 | Gaudreault |
| 2012/0325950 A1 | 12/2012 | Davis et al. |
| 2014/0261889 A1 | 9/2014 | Labbe |
| 2015/0096650 A1 | 4/2015 | Chen |

CYLINDRICAL DEVICE WITH KNIVES CONNECTED THERETO

CROSS REFERENCE TO RELATED APPLICATIONS

This application is a continuation application of U.S. patent application Ser. No. 18/330,941, filed on Jun. 7, 2023, which is a continuation application of U.S. patent application Ser. No. 17/088,997, filed on Nov. 4, 2020, now U.S. Pat. No. 11,711,991, which is a continuation application of U.S. patent application Ser. No. 16/135,101, filed on Sep. 19, 2018, now U.S. Pat. No. 10,856,462, which claims the benefit of U.S. Provisional Patent Application Ser. No. 62/562,092, filed Sep. 22, 2017; the entirety of each is incorporated herein by reference.

TECHNICAL FIELD

The present disclosure relates to a land clearing attachment for connection with a tractor device. More particularly, the land clearing attachment includes a rotor having individual knife blades or teeth oriented in a spaced apart manner wound helically about an outer surface of the rotor.

BACKGROUND INFORMATION

Land clearing attachments are known to be useful tools for removing and mulching materials, such as brush or tree stumps. One form of land clearing attachment for a tractor device is a stump grinder. Another form of land clearing attachment for a tractor device is a mulcher. Some of these attachments include a rotor that rotates to either grind or cut/mulch materials. However, the manner in which the rotor is configured requires the tractor to supply a significant amount of power to the rotor for the rotor to effectively cut, mulch, or grind the materials.

SUMMARY

Issues continue to exist with current land clearing attachments. Namely, issues exist with the amount of power needed to be supplied in order to effectively cut or much materials. Thus, there is a need for a land clearing attachment that can effectively cut or mulch materials in a more efficient manner. The present disclosure addresses these and other issues.

In accordance with one aspect of the present disclosure, a land clearing attachment is provided that more efficiently cuts or clears land/materials. The land clearing attachment may include a rotor having teeth/knives that are in a spiral or semi-spiral arrangement and each tooth/knife cuts on a different plane to create a point chip cut line. Additionally, the teeth/knives are four-sided so that they can be moved to create a new sharp edge. This is unique to a land clearing attachment or mulcher tool. The shape of the knife holder is also unique in that it is angled through 3-dimensions to provide a very accurate chip angle. The knife holder is also a wearable and reusable unit. The angle of the mounting hole is also angled relative to the angle of the helix that all the knives are mounted to and it is not perpendicular to the face of the drum. Instead, it is angled relative to the face of the drum. It balances the drum and substantially reduces the horsepower. While others require 100 horsepower on a tool such as this, the unit of the present disclosure only requires 50 horsepower. It also keeps the material from wrapping, as the drum or rotor prevents a double grind of the material as the material falls away very fast as it is chipped into pieces. Aside from cutting stumps and trees, it will also cut grass along the way. The attachment may be mounted on a 3-point or skid steer style hitch and allow both to be mounted on the same tool as well as a mini excavator. The rotor or drum is formed from about a 1¾ inch thick steel material to add weight. Therefore, less weight is needed in the machine as the weight of the drum offsets it and even then, the whole machine only weighs 900 pounds, whereas most others are approximately 2,500 pounds.

In accordance with one aspect of the present disclosure, an exemplary embodiment may provide a land clearing attachment comprising: a rotor or drum having a first end opposite a second end and a cylindrical sidewall extending from the first end to the second end defining an outer surface of the rotor, and the rotor adapted to rotate about an axis; a first row of independent knives connected to the cylindrical sidewall and position radially outward from the outer surface relative to the axis; wherein the first row of independent knives is offset at an angle from the first end to the second end such that the first row of independent knives winds semi-helically around the rotor. This embodiment or another exemplary embodiment may further provide a holder connected to one knife and connected to the cylindrical sidewall, wherein the holder is machined on plane to offset a cutting action of the one knife. This embodiment or another exemplary embodiment may further provide at least two edges on each knife, wherein the knife is releasably attached to the holder and adapted to be rotated when one of the edges dulls so the other of the at least two edges becomes a leading cutting edge. This embodiment or another exemplary embodiment may further provide a top surface of the one knife having a first area; a bottom surface of the one knife having a second area less than the first area. This embodiment or another exemplary embodiment may further provide a tapered sidewall extending between the top surface and the bottom surface of the one knife. This embodiment or another exemplary embodiment may further provide at least two knives in the first row of independent knives, wherein the at least two knives are spaced apart from each other, and a leading edge on each of the at least two knives cuts on a different plane as the rotor is rotated about the axis. This embodiment or another exemplary embodiment may further provide a leading cutting edge positioned above a bottom surface on each one of the independent knives, wherein the leading cutting edge is adapted chip away material rather than pounding away material.

In yet another embodiment, there may be a second row of independent knives connected to the cylindrical sidewall and position radially outward from the outer surface relative to the axis and spaced from the first row. Further, the first and second rows spiral about 90° along the length of the outer surface. In yet another embodiment, there may be a third row of independent knives connected to the cylindrical sidewall and position radially outward from the outer surface relative to the axis and spaced from the first row and the second row. The first, second, and third rows may spiral about 90° along the length of the outer surface. In yet another embodiment, there may be a fourth row of independent knives connected to the cylindrical sidewall and position radially outward from the outer surface relative to the axis and spaced from the first row, the second row, and the third row. The first, second, third, and fourth rows spiral about 90° along the length of the outer surface. In yet another embodiment, there may be a fifth row of independent knives connected to the cylindrical sidewall and position radially outward from the outer surface relative to the axis and spaced from the first row, the second row, the third row, and the fourth row. In this instance, the first, second, third, and fourth rows spiral about 72° along the length of the outer surface. In yet another embodiment, there may be at least one knife in the first row includes: a top surface spaced from a bottom surface, wherein the at least one knife is shaped as a generally inverted frusto-square pyramid; and a sidewall extending between the top surface and the bottom surface at angle that tapers in a range from about 30° to about 60°. In yet another embodiment, there may four sharpened edges to cut materials during the land clearing or mulching process; and a screw that connects the at least one knife to the rotor adapted to enable the knife to be rotated 90° about a screw axis so as to change a leading cutting edge of the knife when one cutting edge becomes dull.

In yet another aspect, an exemplary embodiment of the present disclosure may provide a rotor for a land clearing attachment comprising: a cylindrical sidewall extending from a first end to a second end defining an outer surface adapted to rotate about an axis a first end opposite a second end and; a plurality of holders coupled to the outer surface arranged in rows that spiral at least semi-helically around the outer surface from the first end to the second end; at least one knife carried by each holder having a plurality of cutting edges that may be rotated when one cutting edge become dull. This exemplary embodiment or another exemplary embodiment may further provide wherein each holder from the plurality of holders includes: a downwardly concave bottom surface that is at least partially complementary in curvature to the outer surface; a hole defined by a planar portion of each holder that aligns with a hole formed in the outer surface to enable passing a screw therethrough; an upwardly extending extension protrudes upwardly from the planar portion of each holder and the extension includes a first angled face and a second angled face that are angled opposite each other and connect with a planar upper portion that is offset parallel to planar portion such that the upper portion is positioned vertically above the planar portion; a wearable material at the upper portion to protect each knife; an angle at which the second face intersects planar portion in a range from about 30° to about 60°; wherein each knife includes: four sharpened edges to cut materials during the land clearing or mulching process; a top surface spaced from a bottom surface, wherein the at least one knife is shaped as a generally inverted frusto-square pyramid; a sidewall defining one sharpened edge extending between the top surface and the bottom surface at angle that tapers in a range from about 30° to about 60°; a countersunk through aperture extending from the top surface to the bottom surface configured to alight with a hole formed in the rotor; and a screw that connects the at least one knife to the holder and adapted to enable the knife to be rotated 90° about a screw axis so as to change a leading cutting edge of the knife when one cutting edge becomes dull.

In accordance with one aspect of the present disclosure, an exemplary embodiment may provide a land clearing attachment for a tractor device includes semi-helically oriented teeth, knives, or blades radially outward from an outer surface of a rotor. Each tooth, knife, or blade is part of a row of independent teeth, knives, or blades. Each row is oriented with an offset angle such that the spirally orientation completes angular offset of about 90° or less. The spiral or helical orientation of the cutting teeth, knives, or blades enables the power to be reduced typically required to effectively rotate a similarly sized rotor.

BRIEF DESCRIPTION OF THE SEVERAL VIEWS OF THE DRAWINGS

A sample embodiment of the disclosure is set forth in the following description, is shown in the drawings and is particularly and distinctly pointed out and set forth in the appended claims. The accompanying drawings, which are fully incorporated herein and constitute a part of the specification, illustrate various examples, methods, and other example embodiments of various aspects of the disclosure. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

Similar numbers refer to similar parts throughout the drawings.

DETAILED DESCRIPTION

Figure 1:
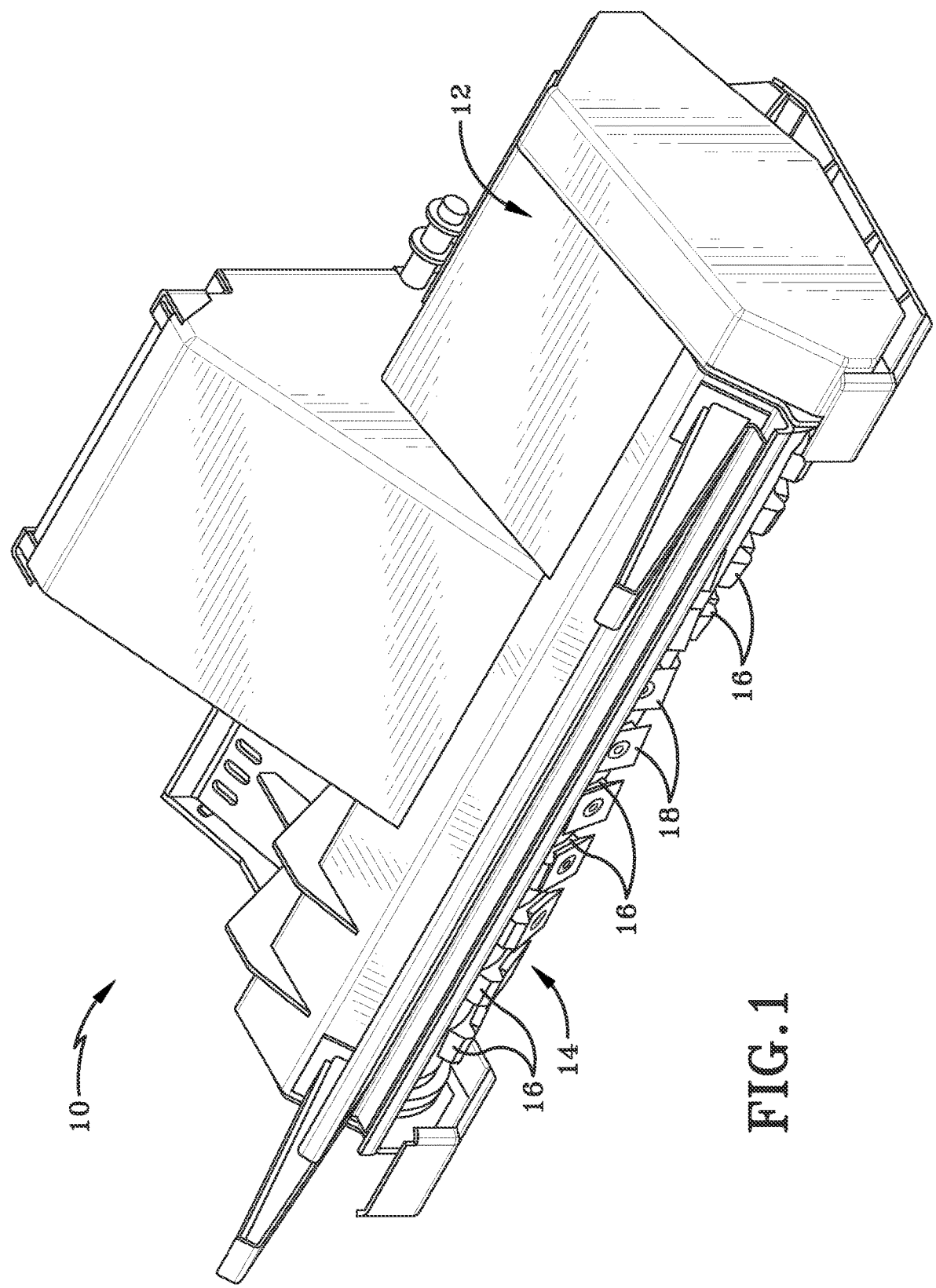
FIG. 1 is a perspective view of a land clearing tool in accordance with the present disclosure.

A land clearing attachment (which may be referred to as a mulcher or a mulching attachment) for connection with an excavator, skid steer, or other tractor device is shown generally at 10. The mulcher attachment 10 includes a housing 12, a rotor 14, a plurality of holders 16, and a plurality of knives 18.

Housing 12 includes a left side and a right side defining a transverse direction therebetween. Housing 12 further includes a forward end and a trailing end defining a longitudinal direction therebetween. In addition, housing 12 includes a top opposite a bottom defining a vertical direction therebetween. The rear or trailing end of housing 12 is constructed with brackets and other connecting mechanisms to attach to a skid steer, an excavator, or other tractor device as one having ordinary skill in the art would understand. In one particular embodiment, housing 12 is implemented in a manner such that the rear end of housing 12 connects with a forward end of the tractor device. As such, the land clearing attachment 10 may be referred to as a forward attachment relative to a tractor device. Housing 12 may include a plurality of sidewalls gears and other mechanisms are retain that effectuate rotational-to-rotational movement. More particularly, housing 12 may retain a plurality of wheels and other connecting mechanisms that attach to a power takeoff on the tractor device. These wheels are operatively connected to rotor 14 so as to effectuate rotational movement of rotor 14 around a transverse axis. The rotation of the rotor 14 about a transverse axis is effectuated by the operable connection with the tractor device such that a powering unit on the tractor device effectuates the rotational movement of rotor 14 about a transverse axis.

Figure 2:
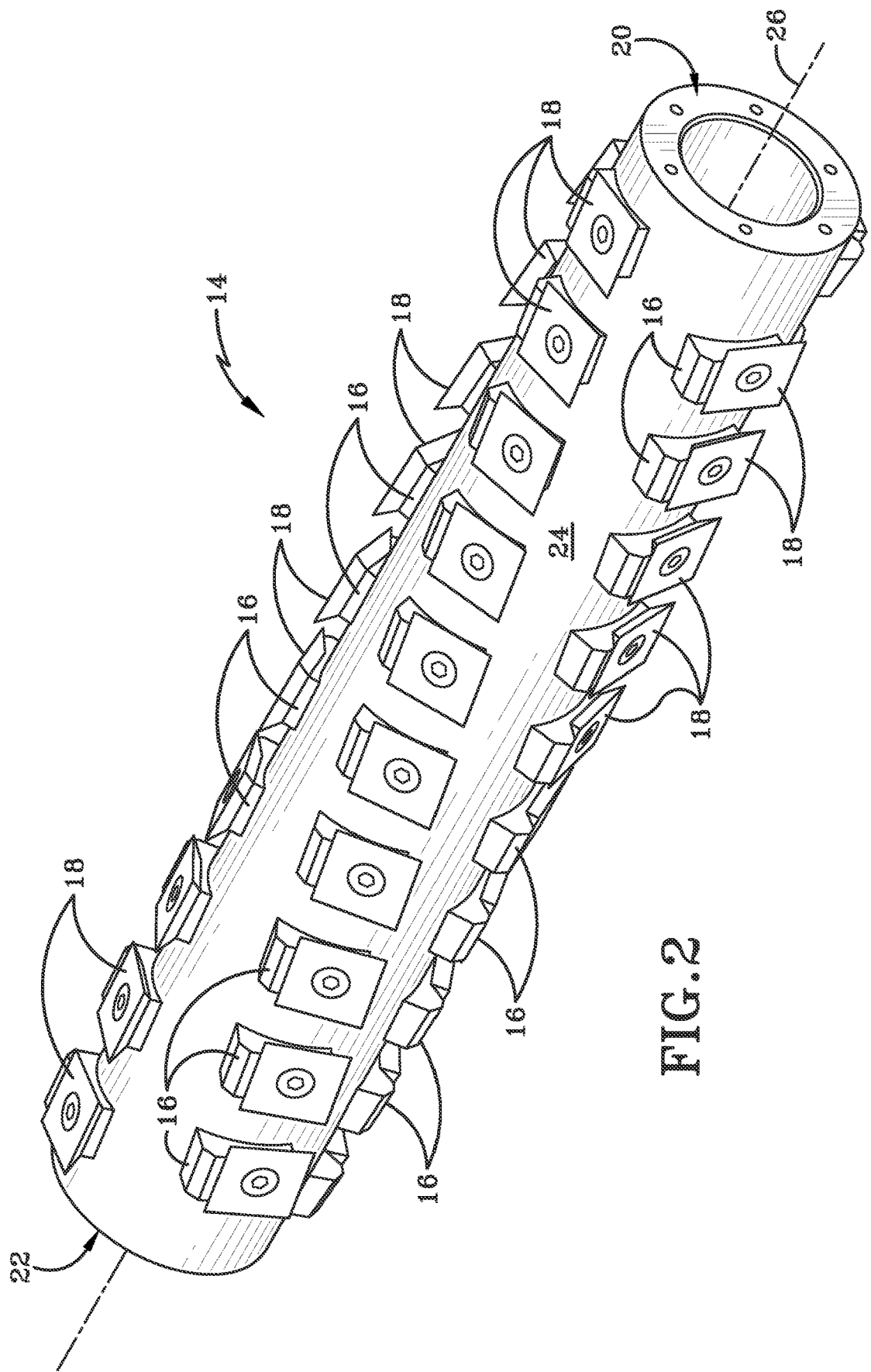
FIG. 2 is a perspective view of a rotor for the land clearing tool in accordance with the present disclosure.

FIG. 2 depicts rotor 14 including a left end 20 and a right end 22. Rotor 14 includes a substantially rigid cylindrical sidewall 24 extending from left end 20 to right end 22. In one particular embodiment, cylindrical sidewall 24 is substantially continuous and uniform in diameter between the left end 20 and the right end 22. The cylindrical sidewall is concentric with a transverse axis 26 about which rotor 14 rotates in response to rotational movement of a power takeoff connector on the tractor device. The diameter of rotor 14 may be in a range from about six inches to about twelve inches. In one particular embodiment, the diameter of rotor 14 is about eight inches. The cylindrical sidewall 24 of rotor 14 defines a plurality of holes therein. In one particular embodiment, the holes extend radially entirely through cylindrical sidewall 24.

Rotor 14 defines a cylindrical central bore 21 that is operably connected to housing 12 via a shaft that is concentric about transverse axis 26. The shaft is removably connected with the rotor 14 so as to be replaceable without the need for welding the rotor 14 and shaft together. Further, at least one adjustable cutter bar on housing 12 is located behind the rotor 14. The adjustable cutter bar is removably connected with housing 12 so as to be replaceable when the adjustable cutter bar is worn. Additionally, the adjustable cutter bar prevents material from wrapping around the rotor 14.

In one particular embodiment, rotor 14 has four rows of holes extending along the length of rotor 14. Notably, the length of rotor 14 is oriented in the transverse direction relative to housing 12. More particularly, the holes may have semi-helically shaped 90° offset. Stated otherwise, there is a first hole of a first row oriented at a twelve o'clock position, a second hole of a second row oriented at a three o'clock position, a third hole of a third row oriented at a six o'clock position, and a fourth hole of a fourth row oriented at a nine o'clock position when viewing the rotor 14 from one of the ends. Each of the rows of holes helically winds approximately 90° from the left end 20 to the right end 22. Stated otherwise, a first row of holes near the left end 20 wind helically in the counterclockwise direction towards a nine o'clock position near the right end 22. In one particular embodiment, the first row of holes begins near a twelve o'clock position near the left end 20 and is near a nine o'clock position near the right end 22. A second row of holes begins near the three o'clock position near the left end 20 and helically winds 90° so as to be near the twelve o'clock position near the right end 22. A third row of holes begins near the six o'clock position near left end 20 and helically winds about 90° so as to be near the three o'clock position near the right end 22. The fourth row of holes begins near the nine o'clock position near the left end 20 and helically winds about 90° so as to be near the six o'clock position near the right end 22. In this instance, each of the four rows of holes is defined by about ten radially extending apertures or bores configured to receive threaded screw or other removable connection member therethrough so as to effectuate the attachment of object to the rotor 14.

Each hole in each row may be coupled with a knife or blade 18. Accordingly, each knife 18 is independent since it is spaced apart from an adjoining blade in the row. Inasmuch as each knife 18 is coupled with the holes, the rotor 14 further includes a first row of knives near the left end 20 wind helically in the counterclockwise direction towards a nine o'clock position near the right end 22. In one particular embodiment, the first row of knives 18 begins near a twelve o'clock position near the left end 20 and spirals such that the first row of knives ends near a nine o'clock position near the right end 22. A second row of knives begins near the three o'clock position near the left end 20 and helically winds about 90° so as to be near the twelve o'clock position near the right end 22. A third row of knives begins near the six o'clock position near left end 20 and helically winds about 90° so as to be near the three o'clock position near the right end 22. The fourth row of knives begins near the nine o'clock position near the left end 20 and helically winds about 90° so as to be near the six o'clock position near the right end 22.

In one particular embodiment, the holder 16 is attached to the rotor 14 via a screw threaded through one of the radially aligned bores defining the row of holes. In this instance, there may be a plurality of holders helically wound about the outer surface of the rotor 14. It is envisioned that one tool holder attaches with the rotor 14 via one hole.

Figure 3A:
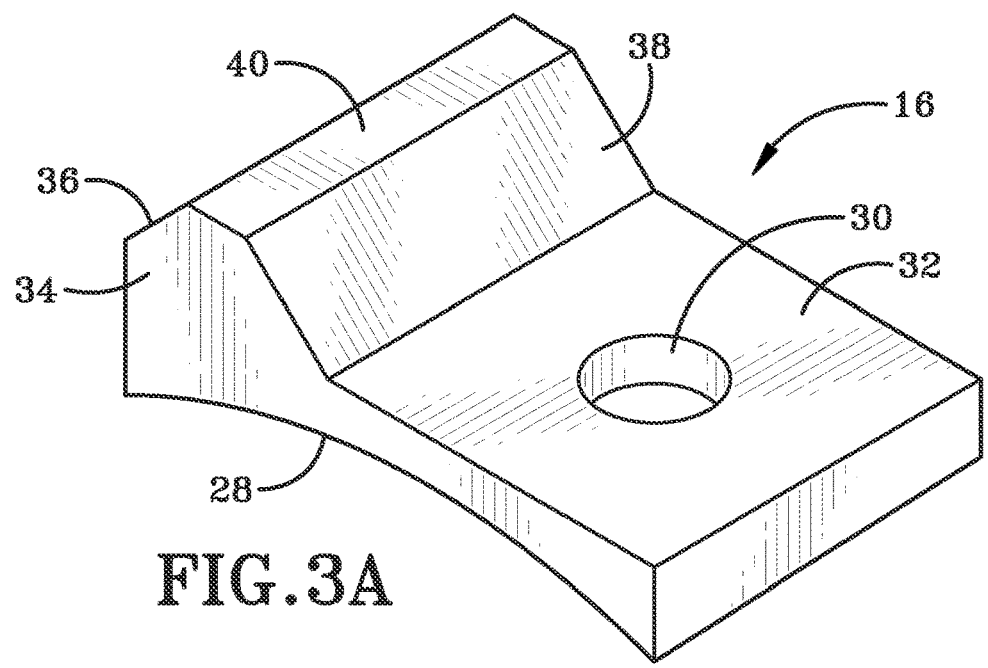
FIG. 3A is a perspective view of a holder for the land clearing tool in accordance with the present disclosure.
Figure 3B:
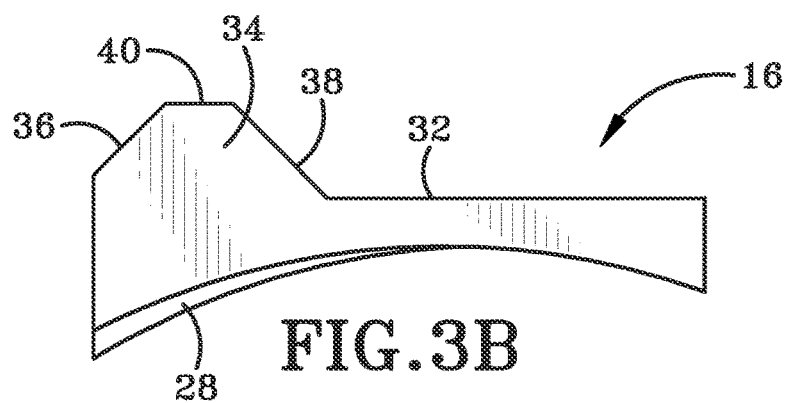
FIG. 3B is side elevation view of the holder.
Figure 3C:
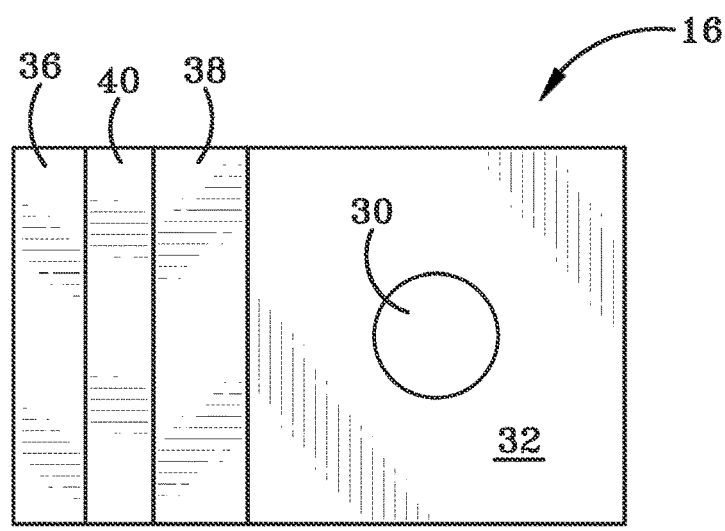
FIG. 3C is a top place view of the holder.
Figure 4A:
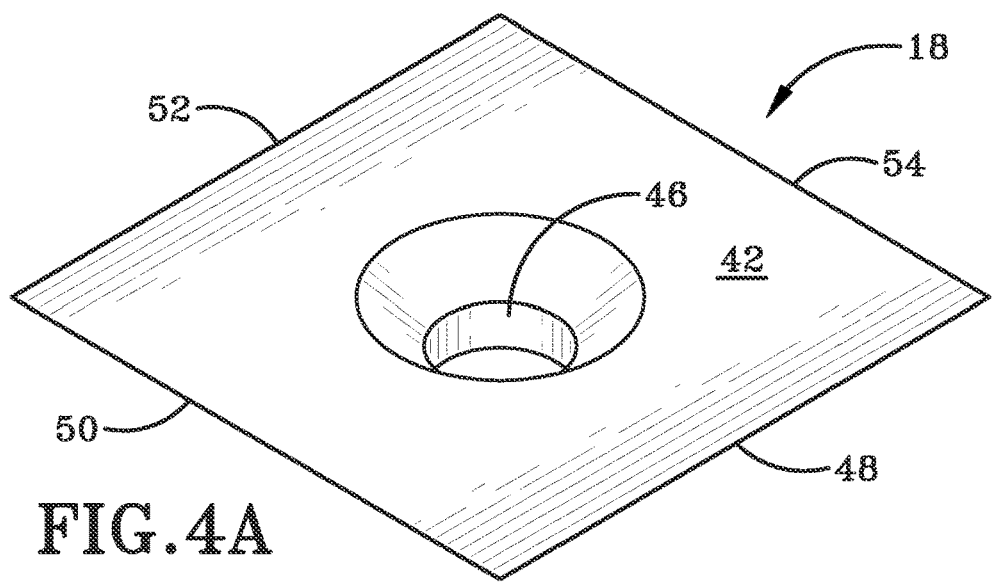
FIG. 4A is a perspective view of a knife for the land clearing attachment in accordance with the present disclosure.
Figure 4B:
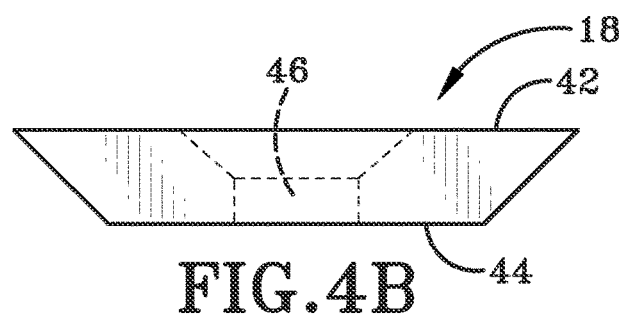
FIG. 4B is a side elevation view of the knife.
Figure 4C:
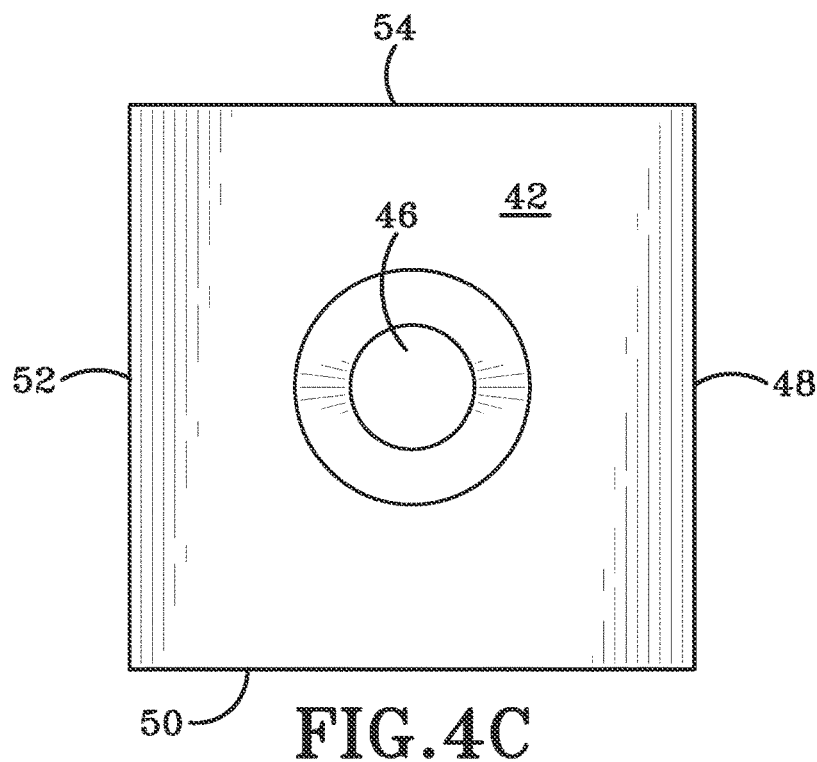
FIG. 4C is a top plan view of the knife.

As depicted in FIG. 3A, FIG. 3B, and FIG. 3C, each holder 16 includes a downwardly concave bottom surface 28 that is at least partially complementary in curvature to the outer surface of cylindrical sidewall 24. Each holder 16 includes a hole 30 which is configured to align with the radially aligned holes in the cylindrical sidewall 24 so as to effectuate the passage of a screw therethrough. However, the hole 30 may not be exactly orthogonal to the bottom surface 28, such that the holder is at a slightly angled (non-orthogonal) orientation relative to outer surface 24 of rotor 14. The hole 30 is defined in a planar portion 32 of the holder 16. An upwardly extending extension 34 protrudes upwardly from the planar portion 32. Extension 34 includes a first angled face 36 and a second angled face 38. Angle faces 36, 38 are angled opposite each other such that the first angled face 36 faces a first direction and the second angled face 38 faces an opposite second direction. The angled faces connect with a planar upper portion 40 that is offset parallel to planar portion 32. In one particular embodiment, the upper portion 40 is positioned vertically above planar portion 32. The holder 16 includes a wearable material at the top 40 in order to protect each knife 18. The angle at which the second face 38 intersects planar portion 32 is in a range from about 30° to about 60°; however, in one particular embodiment, the angle between second face 38 and planar portion 32 is about 45°. The height of the extension 34 is about 0.35 inches above planar portion 32. Each holder 16 includes a reverse side that is machined on plane to offset a cutting action of the each blade or knife 18. Because the tool holder 16 defines the hole 30 therethrough, it may be removed from its connection with the rotor 14 so as to be replaceable in the event it becomes worn and needs replaced with a new tool holder 16.

Each one of the plurality of knives, or an individual knife 18, includes an upwardly facing top surface 42 spaced from a downwardly facing bottom surface 44. Knife 18 is generally an inverted frusto-square pyramidal shape. Stated otherwise, knife 18 is shaped as an inverted truncated right square pyramid. Top surface 42 is generally square shaped having a first surface area. The bottom surface 44 is also square shaped, but has a smaller surface area such that the sidewalls of the teeth/knife 18 angle and taper inwardly from the top surface 42 to the bottom surface 44. In one particular embodiment, the angle at which the sidewalls of knife 18 taper inwardly is in a range from about 30° to about 60°. However, in one particular embodiment, the tapering angle is about 45°. The vertical thickness of the knife 18 is about one-fourth inch to about one-half inch thick, and in one particular embodiment, it is about 0.35 inches. A vertically aligned central through aperture 46 having a conical counter bore extends fully through the knife 18 from the top surface 42 to the second surface 44. Central aperture 46 is configured to align with hole 30 on holder 16. More particularly, when the knife 18 and holder 16 are assembled together so as to attach the knife 18 to the rotor 14, the hole 46 is aligned with the hole 30 on holder 16 which is aligned with a plurality of holes defined radially through the cylindrical sidewall 24 of rotor 14. Accordingly, screw or bolt or other fastening mechanism may be utilized to connect the knife 18 and the holder 16 into the cylindrical surface 24 of rotor 14. Inasmuch as the centrally aligned aperture 46 extends fully through each one of the knives 18, the knives 18 and holders 16 follow a similar 90° offset helical pattern around the outer surface of cylindrical sidewall 24 of rotor 14 complementary to the plurality of holes formed by the rows.

Each knife 18 includes four edges, namely, a first edge 48, a second edge 50, a third edge 52, and a fourth edge 54. Each of the four edges is sharp and is designed to cut materials during the land clearing or mulching process. Additionally, in accordance with one aspect of the present disclosure, the mechanical member, such as the screw, utilized to secure the knife 18 to the holder 16 may be removed and the knife 18 may be rotated 90° about the screw axis so as to change the leading cutting edge when one of the cutting edges becomes dull.

In accordance with another aspect of the present disclosure, a 90° helical offset of the knives 18 mounted on rotor 14 enables each knife to cut on a different plane as the rotor 14 rotates about transverse axis 26. This enables the knives 18 to cut and chip away at the material to be cleared rather than pounding away the material as is conventionally accomplished in rotary mulchers and stump grinders. The chipping away of material effectuated by knives 18 reduces the amount of horsepower required to do the work. For example, the configuration of knives 18 in the 90° offset helical manner around the outer surface of cylindrical sidewall 24 of rotor 14 enables the mulcher attachment 10 to be powered by at 50 horsepower engine on a tractor device. In contradistinction to this, conventional mulchers or stump grinders typically require a minimum horsepower requirement of about 100 horsepower for a rotary mulcher attachment. Thus, the assembly, configuration, and structural embodiments of the present disclosure effectuate and reduce power requirements (i.e., improve efficiency) while still enabling sufficient mulching and cutting of materials to be accomplished.

The spiraling rows of knives 18 connected thereto reduce vibrations when rotor 14 is rotating about transverse axis 26. More particularly, the spiraled arrangement of the helically wound tool holder 16 carrying knives 18 helps balance the rotor 14 as it is rotating about transverse axis 26 so as to reduce vibrations from arrangement fabricated from linear rows of holders 16 and knives 18.

In accordance with one aspect of the present disclosure, the number of rows or knives attached to the outer surface of the rotor 14 may vary depending upon the diameter of the rotor 14. In one example, the rotor 14 has a diameter of about eight inches and there are four rows of helically wound knives 18 oriented at a 90° offset along the length of the rotor 14, however the number of rows of knives 18 may vary. For example, it is possible for a larger diameter rotor 14 to have an increased number of rows of knives thereon. In one implementation, a twelve inch rotor may have five rows of knives winding semi-helically along the length thereof. In this example, when there are five rows, the angle of the offset may be 72°. Stated otherwise, a first knife in a row near the first end 20 of the twelve-inch diameter rotor 14 may be offset 72° from the last knife in the row near the second end 22 of the twelve-inch diameter rotor 14. In other alternative embodiments, it is possible as the diameter of the rotor increases to have four rows of knives 18 thereon, yet the size of the knives would be increased. In one example, the knives are about three inches by three inches square when the diameter of the rotor is about eight inches. In another example, when the diameter of the rotor 14 is increased, the knives 18 may be increased in size to be four inches by four inches square or even five inches by five inches square.

In accordance with one aspect of the present disclosure, the rotor 14 having the geometric and semi-helically wound arrangement of the knives supported by the holders 16 thereon enable the rotor 14 to chip, chop, cut, and mulch various materials that rotor 14 rotates about transverse axis 26. In accordance with one aspect of the present disclosure, the helically wound offset of the knives 18 enables the knives to cut independently from each other at a different angle relative to the material to be chopped. Because each knife acts independently from each other, less force is needed to chop or cut a small piece of material contacting the leading edge of each knife 18. This effectively reduces the amount of horsepower needed to rotate the rotor 14 about its transverse axis during the mulching action.

In operation, the rotor 14 is housed within housing 12. The rotor 14 is oriented transverse relative to housing 12 and supported by the replaceable axis and various other operational rotational assemblies that effectuate the rotor 14 to rotate about transverse axis 26 which is powered by a tractor device that supports the housing 12.

When each knife 18 is assembled on each respective holder 16, the angled face 38 and the extension 34 act as a support for the knife 18. More particularly, the angle at which face 38 angles is similar to the tapering angle of knife 18 between the top surface 42 and the bottom surface 44. Accordingly, the face 38 makes substantial contact with the angled sidewall 24 on knife 18. The upper extension 34 provides a support in the form of a backstop so as to support the knife during its rotational action about axis 26.

The leading edge of each knife contacts material in the ground or near the ground that is to be cleared or mulched. The orientation of each knife is independent and spaced from adjacent knives positioned along the outer surface of the of the rotor 14. When the leading edge of one of the knives becomes worn, the screw securing the knife 18 to the holder 16 may be loosened so as to allow the knife 18 to be rotated 90°. After rotating the knife 18, a new leading edge is established which is shaper than the worn/dulled edge. For example, the first edge 48 may begin as the leading edge. The first edge performs a cutting action by contacting material as the rotor 14 rotates about axis 26. When first edge becomes worn or dull, the knife 18 may be rotated by about 90° about an axis of the screw that connects knife 18 to the holder 16 such that the second edge 50 becomes the new leading edge. This should increase the useful life of the knife 18 about four-fold compared to a conventional mulching tooth that has only one edge.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments. Additionally, any method of performing the present disclosure may occur in a sequence different than those described herein. Accordingly, no sequence of the method should be read as a limitation unless explicitly stated. It is recognizable that performing some of the steps of the method in a different order could achieve a similar result.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms.

The articles "a" and "an," as used herein in the specification and in the claims, unless clearly indicated to the contrary, should be understood to mean "at least one." The phrase "and/or," as used herein in the specification and in the claims (if at all), should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc. As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments. It will also be appreciated by those of skill in the art that references to a structure or feature that is disposed "adjacent" another feature may have portions that overlap or underlie the adjacent feature Spatially relative terms, such as "under", "below", "lower", "over", "upper", "left", "right", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal", "lateral" and the like are used herein for the purpose of explanation only unless specifically indicated otherwise.

Although the terms "first" and "second" (or "third" and so on) may be used herein to describe various features/elements, these features/elements should not be limited by these terms, unless the context indicates otherwise. These terms may be used to distinguish one feature/element from another feature/element. Thus, a first feature/element discussed below could be termed a second feature/element, and similarly, a second feature/element discussed below could be termed a first feature/element without departing from the teachings of the present invention.

An embodiment is an implementation or example of the present disclosure. Reference in the specification to "an embodiment," "one embodiment," "some embodiments," "one particular embodiment," or "other embodiments," or the like, means that a particular feature, structure, or characteristic described in connection with the embodiments is included in at least some embodiments, but not necessarily all embodiments, of the invention. The various appearances "an embodiment," "one embodiment," "some embodiments," "one particular embodiment," or "other embodiments," or the like, are not necessarily all referring to the same embodiments.

If this specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical range recited herein is intended to include all sub-ranges subsumed therein.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of various embodiments of the disclosure are examples and the disclosure is not limited to the exact details shown or described.

What is claimed:

1. A knife for a cylindrical rotor that is to be powered by a drivable device, the knife adapted to be coupled to an exterior surface of the cylindrical rotor to chip, chop, cut, or mulch material contacted by the knife in response to rotation of the cylindrical rotor, the knife comprising:
   at least two sharpened edges, wherein one of the at least two sharpened edges chips, chops, cuts, or mulches material in response to rotation of the cylindrical rotor during land clearing or mulching;
   a top surface spaced from a bottom surface, wherein the knife is shaped generally as an inverted frusto-square pyramid;
   a tapered sidewall defining one sharpened edge, wherein the tapered sidewall extends between the top surface and the bottom surface at an angle;
   an aperture defined from the top surface to the bottom surface adapted to align with a hole formed in the cylindrical rotor; and
   wherein the knife is adapted to be moved to change a leading cutting edge of the knife when the one sharpened edge becomes dull.

2. The knife of claim 1, wherein the aperture is a countersunk aperture extending fully through the knife.

3. The knife of claim 2, wherein the countersunk aperture is a conical countersunk aperture.

4. The knife of claim 3, further comprising a tapered wall, wherein the tapered wall defines the conical countersunk aperture.

5. The knife of claim 4, further comprising a circular edge defining the conical countersunk aperture, wherein the tapered wall extends downward from the circular edge.

6. The knife of claim 1, wherein the knife further comprises an additional two sharpened edges to cut materials during land clearing or mulching.

7. The knife of claim 1, wherein the at least two sharpened edges are defined by the one sharpened edge and a second sharpened edge, and the knife further comprises a third sharpened edge and a fourth sharpened edge.

8. The knife of claim 7, wherein the aperture is equidistant from the one sharpened edge, the second sharpened edge, the third sharpened edge, and the fourth sharpened edge, that define a square.

9. The knife of claim 7, wherein the aperture is equidistant from the one sharpened edge and the second sharpened edge.

10. The knife of claim 7, wherein the aperture is equidistant from the third sharpened edge and the fourth sharpened edge.

11. The knife of claim 7, wherein the one sharpened edge and the second sharpened edge are parallel.

12. The knife of claim 7, wherein the third sharpened edge and the fourth sharpened edge are parallel.

13. The knife of claim 7, wherein the one sharpened edge is perpendicular to the third sharpened edge and the fourth sharpened edge.

14. The knife of claim 7, wherein the second edge is perpendicular to the third edge and the fourth edge.

15. The knife of claim 1, further comprising a thickness of the knife measured from the top surface to the bottom surface.

16. The knife of claim 15, wherein the thickness is in a range from about ¼" to about ½".

17. The knife of claim 1, wherein the angle is between about 30° to about 60°.

18. The knife of claim 1, wherein the top surface and the bottom surface are planar and parallel to one another.

19. The knife of claim 1, further comprising:
a surface area of the top surface; and
a surface area of the bottom surface;
wherein the surface area of the top surface is greater than the surface area of the bottom surface.

20. The knife of claim 19, wherein when the knife is coupled with the cylindrical rotor, the bottom surface of the knife is closer to the exterior surface of the cylindrical rotor than the top surface of the knife.

\* \* \* \* \*